US012769978B2

(12) United States Patent

Shi et al.

(10) Patent No.: US 12,769,978 B2

(45) Date of Patent: Oct. 20, 2026

(54) TRAINING TEXT-TO-IMAGE MODEL

(71) Applicant: BEIJING BAIDU NETCOM SCIENCE TECHNOLOGY CO., LTD., Beijing (CN)

(72) Inventors: Yixuan Shi, Beijing (CN); Wei Li, Beijing (CN); Jiachen Liu, Beijing (CN); Xinyan Xiao, Beijing (CN)

(73) Assignee: Beijing Baidu Netcom Science Technology Co., Ltd., Beijing (CN)

( * ) Notice: Subject to any disclaimer, the term of this patent is extended or adjusted under 35 U.S.C. 154(b) by 120 days.

(21) Appl. No.: 18/770,122

(22) Filed: Jul. 11, 2024

(65) Prior Publication Data

US 2024/0362493 A1 Oct. 31, 2024

(30) Foreign Application Priority Data

Jul. 11, 2023 (CN) ......................... 202310845680.6

(51) Int. Cl.

| | |
|---|---|
| ***G06N 3/006*** | (2023.01) |
| ***G06N 3/045*** | (2023.01) |
| ***G06N 3/0475*** | (2023.01) |
| ***G06N 3/09*** | (2023.01) |
| ***G06N 3/092*** | (2023.01) |

(Continued)

(52) U.S. Cl.

CPC ............. *G06N 3/006* (2013.01); *G06N 3/045* (2023.01); *G06N 3/0475* (2023.01); *G06N 3/09* (2023.01); *G06N 3/092* (2023.01); *G06T 11/00* (2013.01); *G06T 11/60* (2013.01)

(58) Field of Classification Search

CPC .......... G06N 3/092; G06N 3/09; G06N 3/045; G06N 3/0475; G06T 11/00

See application file for complete search history.

(56) References Cited

U.S. PATENT DOCUMENTS

| | | | | |
|---|---|---|---|---|
| 11,341,177 | B1 * | 5/2022 | Ren ..................... | G06F 16/3344 |
| 11,645,498 | B2 * | 5/2023 | Baughman ............. | G06N 3/047 706/15 |

(Continued)

FOREIGN PATENT DOCUMENTS

| | | | |
|---|---|---|---|
| CN | 110390108 | A | 10/2019 |
| CN | 116051668 | A | 5/2023 |
| JP | 2020191080 | A | 11/2020 |

OTHER PUBLICATIONS

Y. Gao, Y. Chen, J. Wang and H. Lu, "Semi-Supervised Scene Text Recognition," in IEEE Transactions on Image Processing, vol. 30, pp. 3005-3016, 2021, doi: 10.1109/TIP.2021.3051485. (Year: 2021).*

(Continued)

*Primary Examiner* — Charles L Beard

(74) *Attorney, Agent, or Firm* — Leydig, Voit & Mayer, Ltd.

(57) ABSTRACT

A method is provided that includes: obtaining a first Text-to-Image model and a pre-trained reward model, wherein the first Text-to-Image model is used to generate a corresponding image based on input text, and the pre-trained reward model is used to score a data pair composed of the input text and the corresponding generated image; and adjusting the parameters of the first Text-to-Image model based on the pre-trained reward model and a reinforcement learning policy to obtain a second Text-to-Image model.

12 Claims, 9 Drawing Sheets

(51) Int. Cl.

| | |
|---|---|
| ***G06T 11/00*** | (2006.01) |
| ***G06T 11/60*** | (2006.01) |

(56) References Cited

U.S. PATENT DOCUMENTS

| | | | | |
|---|---|---|---|---|
| 11,995,803 | B1 * | 5/2024 | Karpman | G06T 5/70 |
| 12,142,027 | B1 * | 11/2024 | Saraee | G06F 16/438 |
| 12,340,557 | B1 * | 6/2025 | Saraee | G06F 16/438 |
| 12,373,702 | B2 * | 7/2025 | Dechene | G06N 3/006 |
| 12,405,876 | B2 * | 9/2025 | Paquin | G06F 8/10 |
| 12,443,980 | B1 * | 10/2025 | Sripada | G06Q 30/0276 |
| 12,513,350 | B1 * | 12/2025 | Li | G06N 3/092 |
| 2016/0210532 | A1 * | 7/2016 | Soldevila | G06V 20/62 |
| 2019/0147355 | A1 * | 5/2019 | Rennie | G05B 13/0255 706/47 |
| 2020/0074340 | A1 * | 3/2020 | Abdi Taghi Abad | G06N 5/048 |
| 2020/0279017 | A1 * | 9/2020 | Norton | G06F 16/3344 |
| 2020/0285996 | A1 * | 9/2020 | Janakiraman | G06N 7/01 |
| 2020/0356634 | A1 * | 11/2020 | Srinivasan | G06F 40/58 |
| 2021/0056408 | A1 * | 2/2021 | Brandt | G06N 3/045 |
| 2021/0201156 | A1 * | 7/2021 | Hafner | G06N 3/006 |
| 2021/0248517 | A1 * | 8/2021 | Soppin | G06N 20/20 |
| 2021/0374338 | A1 * | 12/2021 | Shrivastava | G06F 40/30 |
| 2022/0020065 | A1 * | 1/2022 | Portman | G06N 3/045 |
| 2022/0114725 | A1 * | 4/2022 | Amthor | G06V 20/69 |
| 2022/0198217 | A1 * | 6/2022 | Dong | G06N 3/0464 |
| 2022/0366320 | A1 * | 11/2022 | Liu | G06N 3/0442 |
| 2022/0405473 | A1 * | 12/2022 | Diamanti | G06F 18/22 |
| 2023/0041501 | A1 * | 2/2023 | Weiss | G06V 20/00 |
| 2023/0081171 | A1 * | 3/2023 | Zhang | G06T 11/00 382/157 |
| 2023/0106474 | A1 * | 4/2023 | Ghosh | G06N 20/00 706/12 |
| 2023/0117768 | A1 * | 4/2023 | Shaloudegi | G06N 20/00 706/12 |
| 2023/0153606 | A1 | 5/2023 | Min et al. | |
| 2023/0222676 | A1 * | 7/2023 | Jafari-Khouzani | G06T 3/14 382/100 |
| 2023/0229916 | A1 * | 7/2023 | Chechik | G06N 5/01 706/25 |
| 2023/0281991 | A1 * | 9/2023 | Jo | G06V 10/761 |
| 2023/0333959 | A1 * | 10/2023 | Edwards | G06F 11/302 |
| 2023/0342715 | A1 * | 10/2023 | Tong | G06Q 10/04 |
| 2023/0376674 | A1 * | 11/2023 | He | G06F 40/103 |
| 2024/0029413 | A1 * | 1/2024 | Piergiovanni | G06N 3/0464 |
| 2024/0078393 | A1 * | 3/2024 | Song | G06F 16/3329 |
| 2024/0119298 | A1 * | 4/2024 | Pham | G06N 3/092 |
| 2024/0169211 | A1 * | 5/2024 | Donato | G06N 3/0464 |
| 2024/0169662 | A1 * | 5/2024 | Sajjadi | G06T 15/205 |
| 2024/0177799 | A1 * | 5/2024 | Min | G06N 3/0442 |
| 2024/0193523 | A1 * | 6/2024 | O'Donncha | G06Q 10/06311 |
| 2024/0203006 | A1 * | 6/2024 | Pedersen | G06F 16/53 |
| 2024/0212327 | A1 * | 6/2024 | Geng | G06V 10/774 |
| 2024/0272618 | A1 * | 8/2024 | Zia | G05B 19/4155 |
| 2024/0282419 | A1 * | 8/2024 | Farri | G06F 16/345 |
| 2024/0297957 | A1 * | 9/2024 | Bakunov | G06V 10/25 |
| 2024/0300099 | A1 * | 9/2024 | Tang | B25J 9/163 |
| 2024/0303882 | A1 * | 9/2024 | Zhang | G06T 11/60 |
| 2024/0311617 | A1 * | 9/2024 | Di Palo | G06N 3/045 |
| 2024/0320789 | A1 * | 9/2024 | Hinz | G06T 3/4046 |
| 2024/0320872 | A1 * | 9/2024 | Hinz | G06T 11/00 |
| 2024/0320873 | A1 * | 9/2024 | Hinz | G06T 11/00 |
| 2024/0320912 | A1 * | 9/2024 | Li | G06T 15/20 |
| 2024/0330669 | A1 * | 10/2024 | Pouran Ben Veyseh | G06N 3/045 |
| 2024/0346002 | A1 * | 10/2024 | Abdelaal | G06F 16/215 |
| 2024/0355019 | A1 * | 10/2024 | Assouline | G06V 20/60 |
| 2025/0018298 | A1 * | 1/2025 | Dong | G06N 3/045 |
| 2025/0037009 | A1 * | 1/2025 | Wang | G06N 3/045 |
| 2025/0053784 | A1 * | 2/2025 | Francis | G05D 1/2285 |
| 2025/0053877 | A1 * | 2/2025 | Lewis | G06Q 50/40 |
| 2025/0054210 | A1 * | 2/2025 | Babanin | G06T 11/60 |
| 2025/0095227 | A1 * | 3/2025 | Ungureanu-Contes | G06T 3/4053 |
| 2025/0095256 | A1 * | 3/2025 | Lungu-Stan | G06T 11/60 |
| 2025/0104399 | A1 * | 3/2025 | Wang | G06V 10/7715 |
| 2025/0111139 | A1 * | 4/2025 | Mironica | G06T 11/60 |
| 2025/0111239 | A1 * | 4/2025 | Steenhoek | G06N 3/092 |
| 2025/0117967 | A1 * | 4/2025 | Tambi | G06F 40/166 |
| 2025/0124256 | A1 * | 4/2025 | Agarwal | G06N 3/044 |
| 2025/0131027 | A1 * | 4/2025 | Chen | G06F 16/3344 |
| 2025/0131208 | A1 * | 4/2025 | Luong | G06F 40/30 |
| 2025/0157106 | A1 * | 5/2025 | Paga | G06T 11/60 |
| 2025/0171046 | A1 * | 5/2025 | Linscott | B60W 60/001 |
| 2025/0173917 | A1 * | 5/2025 | Li | G06T 11/00 |
| 2025/0200301 | A1 * | 6/2025 | Chuang | G06F 16/243 |
| 2025/0200379 | A1 * | 6/2025 | Soyer | G06N 3/045 |
| 2025/0225780 | A1 * | 7/2025 | Ding | G06N 3/045 |
| 2025/0232214 | A1 * | 7/2025 | Wang | G06N 20/00 |
| 2025/0235793 | A1 * | 7/2025 | Bradley | G06N 3/094 |
| 2025/0239059 | A1 * | 7/2025 | Nag | G06F 40/279 |
| 2025/0259073 | A1 * | 8/2025 | Azar | G06N 3/045 |
| 2025/0265472 | A1 * | 8/2025 | Chen | G06N 3/045 |
| 2025/0278636 | A1 * | 9/2025 | Agarwal | G06N 3/0475 |
| 2025/0278928 | A1 * | 9/2025 | Yang | G06V 10/7784 |
| 2025/0284971 | A1 * | 9/2025 | Li | G06N 3/092 |
| 2025/0292098 | A1 * | 9/2025 | Shamir | G06N 3/04 |
| 2025/0298815 | A1 * | 9/2025 | Khanna | G06F 16/3322 |
| 2025/0299061 | A1 * | 9/2025 | Xiong | G06N 3/092 |
| 2025/0308083 | A1 * | 10/2025 | Kelkar | G06T 11/00 |
| 2025/0315428 | A1 * | 10/2025 | Iyer | G06F 16/243 |
| 2025/0315462 | A1 * | 10/2025 | Xiong | G06F 16/334 |
| 2025/0322254 | A1 * | 10/2025 | Patel | G06N 3/094 |
| 2025/0322255 | A1 * | 10/2025 | Mitra | G06N 3/096 |
| 2025/0322557 | A1 * | 10/2025 | Hurlburt | G06T 11/00 |
| 2025/0328568 | A1 * | 10/2025 | Aggarwal | G06F 16/338 |
| 2025/0329062 | A1 * | 10/2025 | Li | G06T 11/00 |
| 2025/0342363 | A1 * | 11/2025 | Zhang | G06N 3/092 |
| 2025/0348731 | A1 * | 11/2025 | Zhang | G06F 9/54 |
| 2025/0348751 | A1 * | 11/2025 | Mey | G06N 3/092 |
| 2025/0348753 | A1 * | 11/2025 | Du | G06N 3/0455 |
| 2025/0348788 | A1 * | 11/2025 | Rowe | G06N 20/00 |
| 2025/0349042 | A1 * | 11/2025 | Zhu | G06N 3/0475 |
| 2025/0352907 | A1 * | 11/2025 | Crabtree | A63F 13/355 |
| 2025/0355958 | A1 * | 11/2025 | Tawfiq | G06F 16/9538 |
| 2025/0356204 | A1 * | 11/2025 | Qu | G06N 3/091 |
| 2025/0356223 | A1 * | 11/2025 | Stephanov | G06N 5/04 |
| 2025/0356256 | A1 * | 11/2025 | Walter | G06N 20/00 |
| 2025/0363349 | A1 * | 11/2025 | Liu | G06N 3/08 |
| 2025/0363380 | A1 * | 11/2025 | Dong | G06N 3/092 |
| 2025/0363381 | A1 * | 11/2025 | Shani | G06F 17/11 |
| 2025/0371349 | A1 * | 12/2025 | Xu | G06N 3/08 |
| 2025/0378323 | A1 * | 12/2025 | Pang | G06N 3/08 |
| 2025/0378620 | A1 * | 12/2025 | Korolev | G06T 15/04 |
| 2025/0378682 | A1 * | 12/2025 | Doan | G06V 10/761 |
| 2025/0390352 | A1 * | 12/2025 | Crabtree | G06F 9/5027 |
| 2025/0391156 | A1 * | 12/2025 | Alloulah | G06V 10/774 |
| 2026/0044776 | A1 * | 2/2026 | Shamir | G06N 20/00 |
| 2026/0065562 | A1 * | 3/2026 | Peng | G06N 3/0475 |
| 2026/0119662 | A1 * | 4/2026 | Mantin | G06F 21/566 |

OTHER PUBLICATIONS

B. Paria, A. Lahiri and P. K. Biswas, "PolicyGAN: Training generative adversarial networks using policy gradient," 2017 Ninth International Conference on Advances in Pattern Recognition (ICAPR), Bangalore, India, 2017, pp. 1-6, doi: 10.1109/ICAPR.2017.8593063. (Year: 2017).*

M. Yang et al., "Multitask Learning for Cross-Domain Image Captioning," in IEEE Transactions on Multimedia, vol. 21, No. 4, pp. 1047-1061, Apr. 2019, doi: 10.1109/TMM.2018.2869276. (Year: 2019).*

H. Liu, S. Zhang, K. Lin, J. Wen, J. Li and X. Hu, "Vocabulary-Wide Credit Assignment for Training Image Captioning Models," in IEEE Transactions on Image Processing, vol. 30, pp. 2450-2460, 2021, doi: 10.1109/TIP.2021.3051476. (Year: 2021).*

Ren, Z., Wang, X., Zhang, N., Lv, X., and Li, L.-J., "Deep Reinforcement Learning-based Image Captioning with Embedding Reward", arXiv e-prints, Art. No. arXiv:1704.03899, 2017. doi: 10.48550/arXiv.1704.03899. (Year: 2017).*

(56) References Cited

OTHER PUBLICATIONS

He et al., "Learning Profitable NFT Image Diffusions via Multiple Visual-Policy Guided Reinforcement Learning," Conference: MM '23: The 31st ACM International Conference on Multimedia, p. 1-14 (Jun. 20, 2023) (available at: https://arxiv.org/abs/2306.11731).
Dong et al., "RAFT: Reward rAnked FineTuning for Generative Foundation Model Alignment," Transactions on Machine Learning Research (TMLR), pp. 1-26 (May 25, 2023) (available at: https://arxiv.org/abs/2304.06767).
FAN et a., "DPOK: Reinforcement Learning for Fine-tuning Text-to-Image Diffusion Models," 37th Conference on Neural Information Processing Systems (NeurIPS 2023), pp. 1-26 (May 25, 2023) (available at: https://arxiv.org/abs/2305.16381).
Black et al., "Training Diffusion Models with Reinforcement Learning," International Conference on Learning Representations, pp. 1-20 (May 22, 2023) (available at: https://arxiv.org/abs/2305.13301).
Li et al., "UPainting: Unified Text-to-Image Diffusion Generation with Cross-modal Guidance," Baidu Inc., pp. 1-16 (Nov. 3, 2022) (available at: https://arxiv.org/abs/2210.16031).
Lee et al., "Aligning Text-to-Image Models using Human Feedback," arXiv, pp. 1-20 (Feb. 23, 2023) (available at: https://arxiv.org/abs/2302.12192).
Honda et al., "Image Generation AI Mechanism New Era of Machine Learning? Approaching the Back of Topical Technology" Software Design, Gijutsu Hyronsha Co., Ltd., Issue 389, p. 109-115 (Mar. 18, 2023).
Lee et al., "Aligning Text-to-Image Models using Human Feedback," (Feb. 23, 2023).
Rombach et al., "High-Resolution Image Synthesis with Latent Diffusion Models," Ludwig Maximilian University of Munich & IWR, Heidelberg University, Germany, pp. 10684-10695 (Apr. 13, 2022).
Stiennon et al., "Learning to summarize from human feedback," pp. 1-44 (Sep. 2, 2020).

* cited by examiner

TRAINING TEXT-TO-IMAGE MODEL

CROSS-REFERENCE TO RELATED APPLICATIONS

This application claims priority to Chinese patent application No. 202310845680.6, filed on Jul. 11, 2023, the contents of which are hereby incorporated by reference in their entirety for all purposes.

TECHNICAL FIELD

The present disclosure relates to the technical field of reinforcement learning and computer vision, and specifically to a method for training a Text-to-Image model, an electronic device, and a computer-readable storage medium.

BACKGROUND

Artificial intelligence is the discipline of studying how computers can simulate certain thinking processes and intelligent behaviors of a human being (such as learning, reasoning, thinking, planning, etc.), and there are both hardware-level and software-level technologies. The artificial intelligence hardware technologies generally include technologies such as sensors, special artificial intelligence chips, cloud computing, distributed storage, big data processing, etc. The artificial intelligence software technologies mainly include computer vision technology, speech recognition technology, natural language processing technology, machine learning/deep learning, big data processing technology, knowledge graph technology and other major technological directions.

A Text-to-Image Model (TIM) refers to a model that generates a corresponding image based on input text, and recent studies are mainly based on Diffusion Models, which can generate artistic aesthetic images based on users' relatively vague natural language description. In a Text-to-Image model, making the image output by the model aligning with the semantics and details of the input text and having as high artistry as possible is a research direction that many people pay attention to.

The methods described in this section are not necessarily methods that have been previously conceived or employed. Unless otherwise indicated, it should not be assumed that any method described in this section is considered to be the prior art only due to its inclusion in this section. Similarly, the problems mentioned in this section should not be assumed to be recognized in any prior art unless otherwise indicated.

SUMMARY

According to an aspect of the present disclosure, a method for training a Text-to-Image model is provided, comprising: obtaining a first Text-to-Image model and a pre-trained reward model, wherein the first Text-to-Image model is used to generate a corresponding image based on an input text, and the pre-trained reward model is used to score a data pair composed of the input text and the corresponding generated image; the method for training the Text-to-Image model further comprises: adjusting parameters of the first Text-to-Image model based on the pre-trained reward model and a reinforcement learning policy to obtain a second Text-to-Image model, wherein an accumulated reward obtained by the second Text-to-Image model in a generation sequence for implementing Text-to-Image satisfies a preset condition, and the accumulated reward is obtained based on a reward of each stage of the generation sequence.

According to an aspect of the present disclosure, an electronic device is provided, comprising: a processor; and a memory communicatively connected to the processor; the memory stores instructions executable by the processor, and the instructions, when executed by the processor, cause the processor to perform operations comprising: obtaining a first Text-to-Image model and a pre-trained reward model, wherein the first Text-to-Image model is used to generate a corresponding image based on an input text, and the pre-trained reward model is used to score a data pair composed of the input text and the corresponding generated image; the method for training the Text-to-Image model further comprises: adjusting parameters of the first Text-to-Image model based on the pre-trained reward model and a reinforcement learning policy to obtain a second Text-to-Image model, wherein an accumulated reward obtained by the second Text-to-Image model in a generation sequence for implementing Text-to-Image satisfies a preset condition, and the accumulated reward is obtained based on a reward of each stage of the generation sequence.

According to an aspect of the present disclosure, a non-transitory computer-readable storage medium that stores computer instructions is provided, wherein the computer instructions are used to enable a computer to perform operations comprising: obtaining a first Text-to-Image model and a pre-trained reward model, wherein the first Text-to-Image model is used to generate a corresponding image based on an input text, and the pre-trained reward model is used to score a data pair composed of the input text and the corresponding generated image; the method for training the Text-to-Image model further comprises: adjusting parameters of the first Text-to-Image model based on the pre-trained reward model and a reinforcement learning policy to obtain a second Text-to-Image model, wherein an accumulated reward obtained by the second Text-to-Image model in a generation sequence for implementing Text-to-Image satisfies a preset condition, and the accumulated reward is obtained based on a reward of each stage of the generation sequence.

BRIEF DESCRIPTION OF THE DRAWINGS

The drawings illustrate embodiments and constitute a part of the specification and are used in conjunction with the textual description of the specification to explain the example implementations of the explanation embodiments. The illustrated embodiments are for illustrative purposes only and do not limit the scope of the claims. Throughout the drawings, like reference numerals refer to similar but not necessarily identical elements.

DETAILED DESCRIPTION OF EMBODIMENTS

The example embodiments of the present disclosure are described below in conjunction with the accompanying drawings, including various details of the embodiments of the present disclosure to facilitate understanding, and they should be considered as example only. Therefore, one of ordinary skill in the art will recognize that various changes and modifications may be made to the embodiments described herein without departing from the scope of the present disclosure. Similarly, descriptions of well-known functions and structures are omitted in the following description for the purpose of clarity and conciseness.

In the present disclosure, unless otherwise specified, the terms “first”, “second” and the like are used to describe various elements and are not intended to limit the positional relationship, timing relationship, or importance relationship of these elements, and such terms are only used to distinguish one element from another. In some examples, the first element and the second element may refer to the same instance of the element, while in some cases they may also refer to different instances based on the description of the context.

The terminology used in the description of the various examples in this disclosure is for the purpose of describing particular examples only and is not intended to be limiting. Unless the context clearly indicates otherwise, if the number of elements is not specifically defined, the element may be one or more. In addition, the terms “and/or” used in the present disclosure encompass any one of the listed items and all possible combinations thereof.

Embodiments of the present disclosure will be described in detail below with reference to the accompanying drawings.

Figure 1:
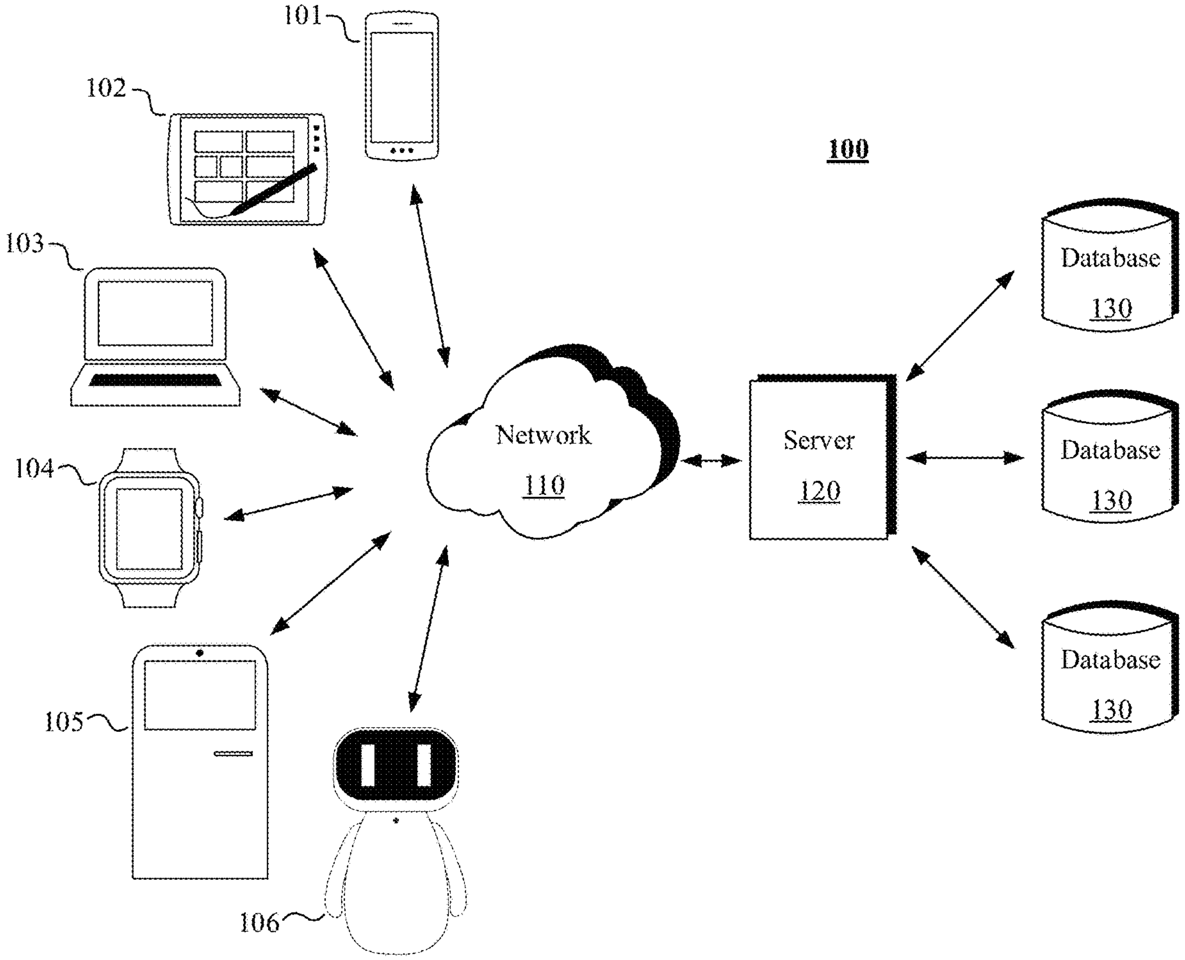
FIG. 1 illustrates a schematic diagram of an example system 100 in which various methods and apparatuses described herein may be implemented according to embodiments of the present disclosure.

FIG. 1 illustrates a schematic diagram of an example system 100 in which various methods and apparatuses described herein may be implemented in accordance with embodiments of the present disclosure. Referring to FIG. 1, the system 100 includes one or more client devices 101, 102, 103, 104, 105, and 106, a server 120, and one or more communication networks 110 that couple the one or more client devices to the server 120. The client devices 101, 102, 103, 104, 105, and 106 may be configured to execute one or more applications.

In embodiments of the present disclosure, the server 120 may run one or more services or software applications that enable the execution of the method for training the Text-to-Image model provided by the embodiments of the present disclosure.

In some embodiments, the server 120 may further provide other services or software applications, which may include non-virtual environments and virtual environments. In some embodiments, these services may be provided as web-based services or cloud services, such as to users of the client devices 101, 102, 103, 104, 105, and/or 106 under a Software as a Service (SaaS) model.

In the configuration shown in FIG. 1, the server 120 may include one or more components that implement functions performed by the server 120. These components may include software components, hardware components, or a combination thereof that are executable by one or more processors. A user operating the client devices 101, 102, 103, 104, 105, and/or 106 may sequentially utilize one or more client applications to interact with the server 120 to utilize the services provided by these components. It should be understood that a variety of different system configurations are possible, which may be different from the system 100. Therefore, FIG. 1 is an example of a system for implementing the various methods described herein and is not intended to be limiting.

The client devices may provide interfaces that enable the user of the client devices to interact with the client devices. The client devices may also output information to the user via the interface. Although FIG. 1 depicts only six client devices, those skilled in the art will understand that the present disclosure may support any number of client devices.

The client devices 101, 102, 103, 104, 105, and/or 106 may include various types of computer devices, such as portable handheld devices, general-purpose computers (such as personal computers and laptop computers), workstation computers, wearable devices, smart screen devices, self-service terminal devices, service robots, in-vehicle devices, gaming systems, thin clients, various messaging devices, sensors or other sensing devices, and the like. These computer devices may run various types and versions of software applications and operating systems, such as Microsoft Windows, Apple iOS, Unix-like operating systems, Linux or Linux-like operating systems (e.g., Google Chrome OS); or include various mobile operating systems, such as Microsoft Windows Mobile OS, iOS, Windows Phone, Android. The portable handheld devices may include cellular telephones, smart phones, tablet computers, personal digital assistants (PDA), and the like. The wearable devices may include head-mounted displays (such as smart glasses) and other devices. The gaming systems may include various handheld gaming devices, Internet-enabled gaming devices, and the like. The client devices can execute various different applications, such as various Internet related applications, communication applications (e.g., e-mail applications), Short Message Service (SMS) applications, and may use various communication protocols.

The network 110 may be any type of network well known to those skilled in the art, which may support data communication using any of a variety of available protocols (including but not limited to TCP/IP, SNA, IPX, etc.). By way of example only, one or more networks 110 may be a local area network (LAN), an Ethernet-based network, a token ring, a wide area network (WAN), an Internet, a virtual network, a virtual private network (VPN), an intranet, an external network, a blockchain network, a public switched telephone network (PSTN), an infrared network, a wireless network (e.g., Bluetooth, WiFi), and/or any combination of these and/or other networks.

The server 120 may include one or more general-purpose computers, a dedicated server computer (e.g., a PC (personal computer) server, a UNIX server, a mid-end server), a blade server, a mainframe computer, a server cluster, or any other suitable arrangement and/or combination. The server 120 may include one or more virtual machines running a virtual operating system, or other computing architectures involving virtualization (e.g., one or more flexible pools of a logical storage device that may be virtualized to maintain virtual storage devices of a server). In various embodiments, the server 120 may run one or more services or software applications that provide the functions described below.

The computing unit in the server 120 may run one or more operating systems including any of the operating systems described above and any commercially available server operating system. The server 120 may also run any of a variety of additional server applications and/or intermediate layer applications, including a HTTP server, an FTP server, a CGI server, a Java server, a database server, etc.

In some implementations, the server 120 may include one or more applications to analyze and merge data feeds and/or event updates received from the user of the client devices 101, 102, 103, 104, 105, and/or 106. The server 120 may also include one or more applications to display the data feeds and/or the real-time events via one or more display devices of the client devices 101, 102, 103, 104, 105, and/or 106.

In some embodiments, the server 120 may be a server of a distributed system, or a server incorporating a blockchain. The server 120 may also be a cloud server, or an intelligent cloud computing server or an intelligent cloud host with an artificial intelligence technology. The cloud server is a host product in the cloud computing service system used to overcome the defects of management difficulty and weak service expansibility that exist in the conventional physical host and Virtual Private Server (VPS) service.

The system 100 may also include one or more databases 130. In certain embodiments, these databases may be used to store data and other information. For example, one or more of the databases 130 may be used to store information such as audio files and video files. The database 130 may reside in various locations. For example, the database used by the server 120 may be local to the server 120, or may be remote from the server 120 and may communicate with the server 120 via a network-based or dedicated connection. The database 130 may be of a different type. In some embodiments, the database used by the server 120 may be, for example, a relational database. One or more of these databases may store, update, and retrieve data to and from the database in response to a command.

In some embodiments, one or more of the databases 130 may also be used by an application to store application data. The database used by an application may be a different type of database, such as a key-value repository, an object repository, or a conventional repository supported by a file system.

The system 100 of FIG. 1 may be configured and operated in various ways to enable application of various methods and devices described according to the present disclosure.

Figure 2:
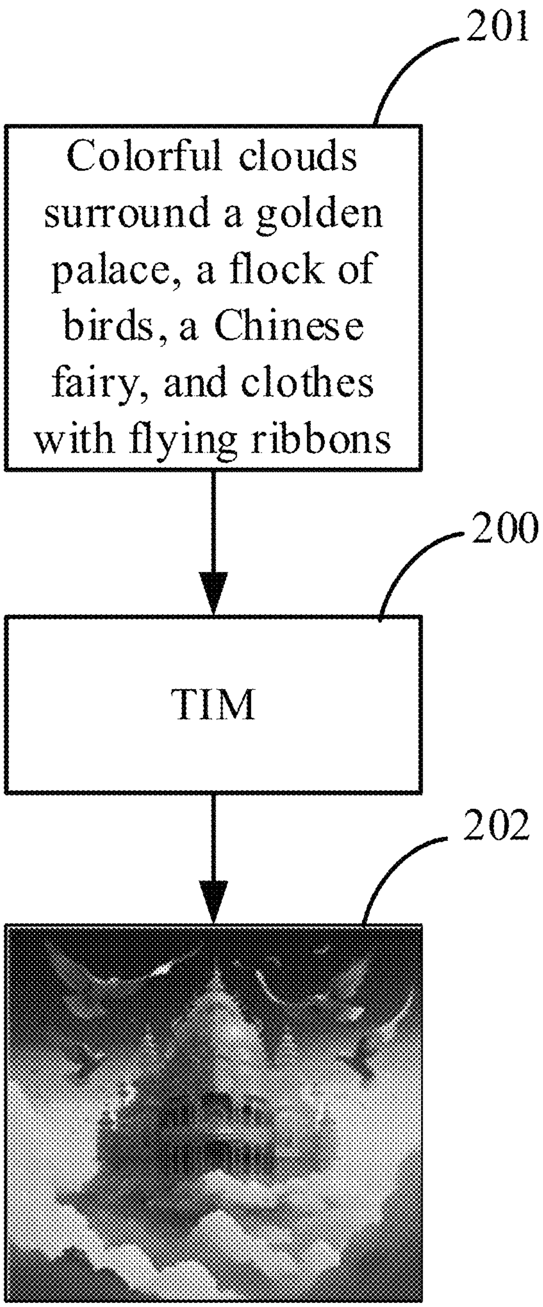
FIG. 2 illustrates an interaction schematic diagram of each Text-to-Image model described in a plurality of embodiments of the present disclosure.

FIG. 2 illustrates an interaction schematic diagram of each Text-to-Image model described in a plurality of embodiments of the present disclosure. Referring to FIG. 2, the Text-to-Image Model (TIM) 200 refers to a model that generates a corresponding image based on input text, and recent studies mainly focus on Diffusion Models, which can generate relatively artistic aesthetic images (i.e., generate the corresponding generated image 202 based on the input text 201) based on users' relatively vague natural language description (i.e., the input text 201) (Prompt). In the Text-to-Image model 200, to make the model-generated image 202 aligning with the semantics and details of the input text and having as high artistry as possible is a research direction that many people pay attention to.

Taking the Text-to-Image model 200 shown in FIG. 2 as an example, the input text 201 includes "colorful clouds surround a golden palace, a flock of birds, a Chinese fairy, and clothes with flying ribbons", that is, the input text 201 includes at least four entities, namely, clouds, palace, birds, and fairy. The entity attribute of the clouds and the palace is a color attribute (colorful clouds and a golden palace), the entity attribute of the birds is a quantity attribute (the entity of a plurality of bird form the entity of a flock of bird), and the entity attribute of the Chinese fairy is a style attribute (Chinese fairy, clothes with flying ribbons), etc. However, the generated image 202 of the Text-to-Image model 200 only includes "colorful clouds surround a golden palace and a flock of birds", that is, the generated image 202 includes only three entities, namely, clouds, palaces and birds, however does not include the entity of the fairy, therefore the generated image 202 does not align with the number of entities in the input text 201. Therefore, for the user who uses the Text-to-Image model to generate an image, after assessing whether the generated image 202 of the Text-to-Image model 200 aligns with the input text 201 from the perspective of a human being, there are several directions in which details still need to be refined: 1) the number of entities; 2) the entity attributes; 3) the combination of multiple entities; 4) the background of the image; and 5) the style of the image. Generating an image having no error in details in each direction can enhance the technical capabilities of Text-to-Image-like products and improve user satisfaction.

For the above technical problems, the present disclosure provides a method for training a Text-to-Image model.

Figure 3:
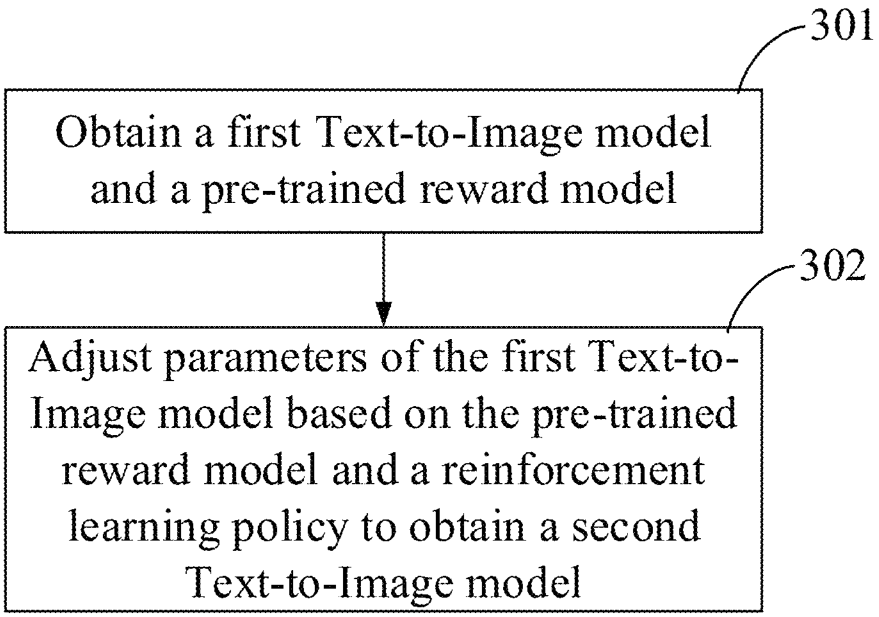
FIG. 3 illustrates a flowchart of a method for training a Text-to-Image model according to embodiments of the present disclosure.

FIG. 3 illustrates a flowchart of a method for training a Text-to-Image model according to embodiments of the present disclosure. As shown in FIG. 3, the method for training a Text-to-Image model comprises:

Step S301, obtaining a first Text-to-Image model and a pre-trained reward model, wherein the first Text-to-Image model is used to generate a corresponding image based on an input text, and the pre-trained reward model is used to score a data pair composed of the input text and the corresponding generated image.

Since a plurality of output results (i.e., the generated images) can be generated for a same input text, it is necessary to use a reward model (RM) to score the generated images, and thus to generate a reward signal, which ranks or evaluates the generated images from a human perspective.

As a feasible implementation, a simple binary reward signal may be used, for example, using a "+" or "−" symbol to represent a reward or a penalty being given, that is, the score by the reward model is 0 or 1.

Since the binary reward signal may not fully reflect the differences of the generated images in some cases, as a feasible implementation, the reward signal can be represented by an integer between 0 and 5, that is, the score by the reward model is an integer between 0 and 5, where 5 represents the highest reward, and 0 represents the lowest reward. Such a reward signal enables the model to better understand the quality of the generated image, and helps to improve the performance of the model in the subsequent adjustment stage.

For the same generated image, when scoring is performed from different evaluation perspectives, for example, when the same generated image is scored by different evaluators, evaluator 1 may score 5, and evaluator 2 may score 3, therefore it is difficult for the model to distinguish whether the image is good or bad during learning. Since it is difficult to standardize the evaluation standard by scoring absolute scores, as a feasible implementation, a relative ranking approach can be used to rank the quality of the results, for example, for the generated image A and the generated image B, evaluator 1 considers that A>B, that is, evaluator 1 thinks that the generated image A is more consistent with the expectation than the generated image B, and evaluator 2 also considers that A>B, therefore the model can better distinguish the relatively high-quality image and inferior image among a plurality of generated images based on the relative ranking mode.

By collecting data which is manually fed back by the reward model and training the reward model in a comparative learning manner, the evaluation order of the reward model conforms to the general cognition of human beings.

Step S302, adjusting the parameters of the first Text-to-Image model based on the pre-trained reward model and a reinforcement learning policy to obtain a second Text-to-Image model, wherein an accumulated reward obtained by the second Text-to-Image model in a generation sequence for implementing Text-to-Image satisfies a preset condition, and the accumulated reward is obtained based on a reward of each stage of the generation sequence.

The reinforcement learning policy is the product of machine learning behaviorism, and the basic idea thereof is that an intelligent body obtains intelligence through a continuous interaction with the environment. The reinforcement learning policy is performed based on the environment (State), the subject (Actor), the behavior (Action), and the reward (Reward), where the environment is the current state, the subject is the object that interacts with the environment and performs the action, the behavior is the action performed by the subject, and the reward is the feedback given with respect to the specific behavior of the subject.

Corresponding to the generation sequence for implementing the Text-to-Image, the subject (Actor) is the Text-to-Image model of the current stage, the environment (State) may be the input text and the generated image corresponding to the Text-to-Image model, the behavior (Action) is the output noise corresponding to the Text-to-Image model, and the reward (Reward) may be designed as required, for example, if the product user feedback is more concerned, a reward based on the user feedback may be designed. In this process, the step of denoising the Text-to-Image model to generate an image is used as the reinforcement learning trajectory, and the reward signal is used to control the whole generation process, so that the model is optimized in the direction of a high accumulated reward.

Errors that occur during the sequential execution of the model can be effectively reduced by using a first Text-to-Image model as the basis of the training, thereby improving the quality of the generated result. In this way, the initial model (the first Text-to-Image model) can better understand each input and the corresponding output, and perform a corresponding operation on the input. As a feasible implementation, fine-tuning training may also be performed on the first Text-to-Image model by using a relatively high-quality data pair, thereby improving the overall performance of the model. The relatively high-quality data pair may be an additional Image-Text pair, for example, a manually labeled Image-Text pair.

Various aspects of the method according to embodiments of the present disclosure are further described below.

According to some embodiments, the preset conditions include one condition that the accumulated reward obtained by the second Text-to-Image model in the generation sequence for implementing the Text-to-Image is higher than the accumulated reward obtained by the first Text-to-Image model in the generation sequence for implementing the Text-to-Image.

Since the Text-to-Image model generally generates a final result after many times of environment (State)-behavior (Action), that is, there may be a plurality of input text and generated images. Although each behavior (Action) has a reward (Reward), that is, each output noise is scored, the sum of all the rewards, that is, the accumulated reward, is finally actually reflected to the result. The environment (State) in the reinforcement learning policy may have countless situations, and there may also be many feasible solutions under one environment (State). Therefore, if the parameters are updated after every cycle of State-Action-Reward, this model would become very “short-sighted” or even difficult to converge, therefore, it is likely that the model can only cope with the “current situation” and cannot cope with numerous environments (State). Therefore, the ultimate object of the reinforcement learning policy is the optimal of the sequence (Trajectory), rather than the optimal of any of the actions (Action).

Figure 4:
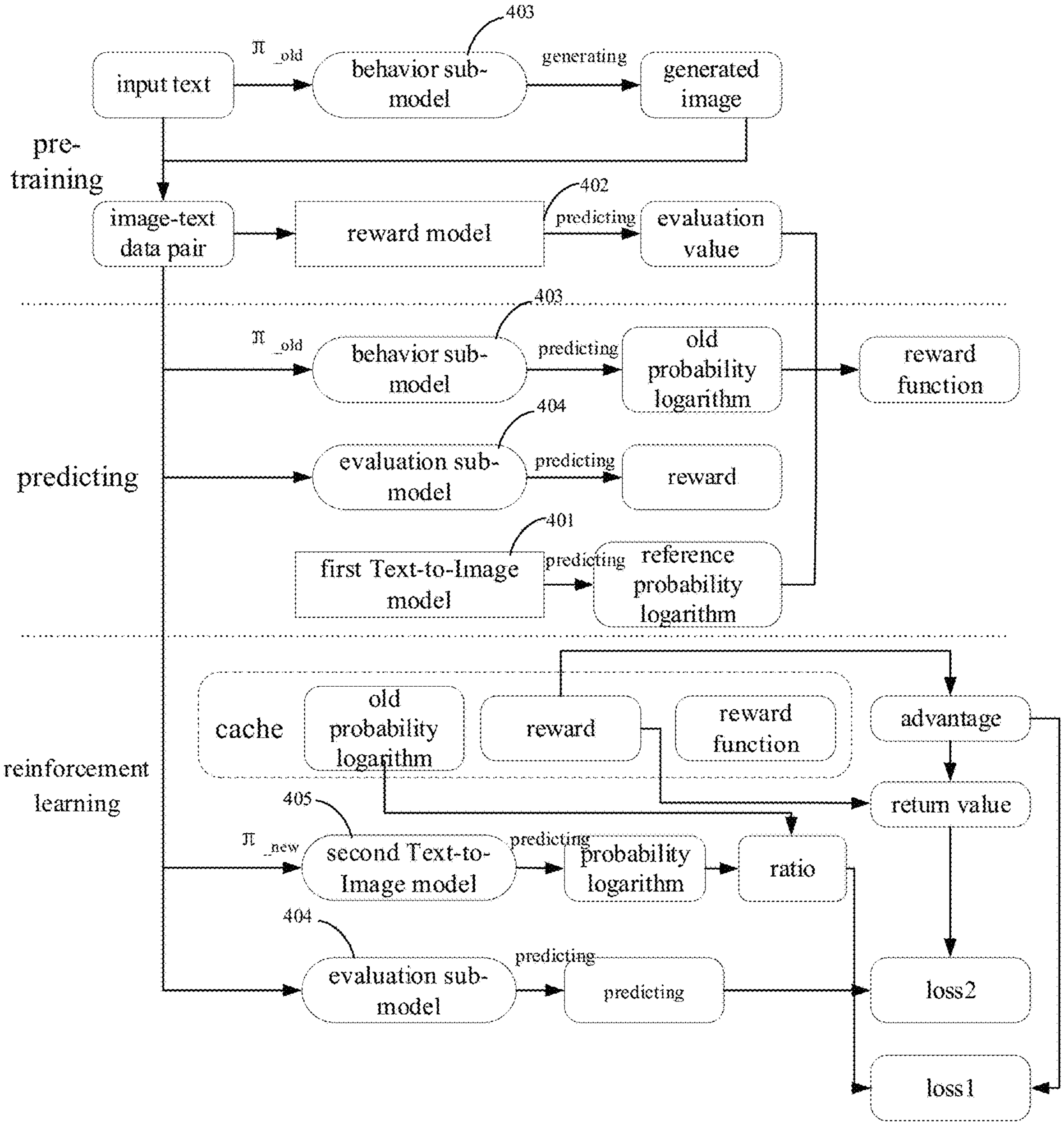
FIG. 4 illustrates a schematic diagram of a reinforcement learning policy in a method for training a Text-to-Image model according to embodiments of the present disclosure.

According to some embodiments, FIG. 4 illustrates a schematic diagram of a reinforcement learning policy in a method for training a Text-to-Image model according to embodiments of the present disclosure. As shown in FIG. 4, the reinforcement learning policy includes a proximal policy optimization (PPO) algorithm.

The proximal policy optimization algorithm is an improved algorithm of policy gradients. In a traditional policy gradient algorithm, the policy weight is updated based on a target function gradient and a step length, therefore, the updating process may have two common problems, that is, Overshooting and Undershooting, wherein Overshooting means that the updating misses the reward peak value and falls into a suboptimal policy region, and Undershooting means that taking an excessively small updating step length in the gradient direction causes slow convergence.

Among the problems of supervised learning, Overshooting is not a big problem because the data is fixed and can be re-corrected in the next stage (epoch), but among the problems of reinforcement learning, if falling into a suboptimal policy region due to Overshooting, future sample batches may not provide much meaningful information, and updating the policy using the suboptimal data samples leads to unrecoverable bad positive feedback.

The proximal policy optimization PPO algorithm solves this problem by setting a target divergence, and it is expected that each update is located in a certain interval around the target divergence. Wherein, the target divergence should be large enough to significantly change the policy, but also should be small enough to keep the update stable. After each update, the proximal policy optimization PPO algorithm checks the size of the update. If the final updated divergence exceeds 1.5 times the target divergence, the loss factor$\beta$ is doubled in the next iteration to increase the punishment. On the contrary, if the update is too small, the loss factor$\beta$ is halved to effectively expand the trust region.

According to some embodiments, the proximal policy optimization PPO algorithm uses the behavior sub-model 403 and the evaluation sub-model 404, the behavior sub-model 403 is obtained based on the initialization of the first Text-to-Image model 401, and the evaluation sub-model 404 is obtained based on the initialization of the pre-trained reward model 402.

The selection of the initial point can determine whether the algorithm converges to a certain extent, and when it converges, the initial point can determine how fast the learning converges and whether it can converge to a high-cost point or a low-cost point. An initialization which is too large may result in gradient explosion, and an initialization which is too small may result in gradient disappearance. Therefore, the policy may be trained using offline data (i.e., the data collected by a human presenter, a script policy, or other reinforcement learning intelligent agent) and be used to initialize a new reinforcement learning policy. This process makes the new reinforcement learning policy looks like it is pre-trained. Then, the policy is used to initialize the subject (i.e., the behavior sub-model, Actor)—evaluation (i.e., the evaluation sub-model, Critic) network for fine tuning, where the pre-trained first Text-to-Image model 401 is used as the initial subject (Actor), and the pre-trained reward model 402 is used as the initial evaluation (Critic). Random exploration of the state space is avoided by using a prior information. The prior information helps the intelligent agent to understand which states of the environment are good and should be further explored. Meanwhile, the first Text-to-Image model 401 and the reward model 402 are simultaneously fine-tuned to enable the fine-tuned second Text-to-Image model 405 to consider the factor of the reward model in order to avoid detail problems.

According to some embodiments, the generation sequence comprises at least one stage, wherein, for each stage of the generation sequence, the behavior sub-model 403 generates the corresponding output noisy image based on the input text provided, and the evaluation sub-model 404 outputs the reward of the current stage based on the input text and the output noisy image of the current stage.

For example, two images Y1 and Y2 are generated based on the same input text X, where one is from the first Text-to-Image model, and the other one is from the Text-to-Image model of the current iteration through the reinforcement learning policy. The generated images of the two models above are compared to calculate a differential reward, which can also be considered as a penalty item since it can be positive or negative. This item is used to reward or punish the degree to which the generation of the reinforcement learning policy in each training batch deviates from the initial model (i.e., the first Text-to-Image model) to ensure that the model outputs a reasonable generated image. Removing this penalty item may cause the model to generate a gibberish patchwork image in the optimization to fool the reward model in order to provide a high reward value.

The reward is a function that generates a scalar that represents the "goodness" of the agent that is in a particular state and takes a particular action.

According to some embodiments, the reward of the current stage includes the relative entropy between the output of the behavior sub-model 403 in the previous stage prior to the current stage and the output of the behavior sub-model 403 in the current stage.

In the generation sequence, the reward of the noisy image has only the latter item Kullback-Leible (KL) divergence with a loss (i.e., the KL divergence), and the KL divergence can be used to measure the degree of difference between two distributions. The smaller the difference, the smaller the KL divergence. When the two distributions are consistent, the KL divergence is 0.

Therefore, by using the KL divergence as a penalty item in the reinforcement learning policy, the reward model and the pre-trained model can be simultaneously fine-tuned to enable the generation model to consider the factor of the reward model in order to avoid detail problems.

According to some embodiments, the reward of the current stage may also include the difference between the evaluation value of the previous stage prior to the current stage and the evaluation value of the current stage, wherein the evaluation value is scored by the pre-trained reward model 402 based on the provided input text and the corresponding output noisy image.

Since the generated noisy image itself can be evaluated, the score of itself by the reward model can also be used as a reward; and the reward of each step in the sequence can be set as the score by the reward model.

As a feasible implementation, the reward model may also be directly replaced by a manually identified reward score. It can be understood that the reward model may be designed as required, for example, when the product user's feedback is more concerned, a reward based on the user feedback may be designed.

According to some embodiments, the accumulated reward obtained in the generation sequence comprises a total score and a loss item, wherein the total score is obtained by the pre-trained reward model based on the initial input and the final output of the generation sequence, and the loss item is the product of the reward of the last stage of the generation sequence and the loss coefficient.

The reward function may be designed as:

$$\text{objective}(\theta) = \text{score} - \beta(\log\pi_{\theta'}(a_t|s_t) - \log\pi_{SFT}(a_t|s_t))$$

where $\theta$ is the generation model parameter; score is the score of the input text (initial input) and the generated image (final output) by the reward model; $a_t$,$s_t$ are the behavior (Action) and the environment (State) at moment t, that is, the output noise, the input text, and the output noisy image of the corresponding Text-to-Image model; $\pi_{SFT}$ is the pre-trained first Text-to-Image model parameter, and $\pi_{\theta'}$ is the Text-to-Image model parameter of the current iteration in the reinforcement learning policy; and $\beta$ is the loss coefficient.

This formula is preceded by a positive value, and the purpose of score is to make the total score accumulated larger and better in meeting the expectation; and the second item is a penalty item that enables the trained model not to deviate from the previously adjusted model, and otherwise, some results that do not meet the expectation may be output.

According to some embodiments, the parameters of the second Text-to-Image model 405 are obtained by a back-propagation algorithm based on the accumulated reward in the generation sequence of the second Text-to-Image model 405.

The emergence of back-propagation (BP) algorithm is a major breakthrough in the development of neural network, and is also the basis of many deep learning training methods. The method can calculate the gradient of the loss function to each parameter in a neural network, and update the parameters through cooperation with an optimization method, and reduce the loss function. The reward function may be considered as a positive loss function, and the whole generation process is controlled by the reward signal, so that the model is optimized in the direction of a high accumulated reward.

Figure 5:
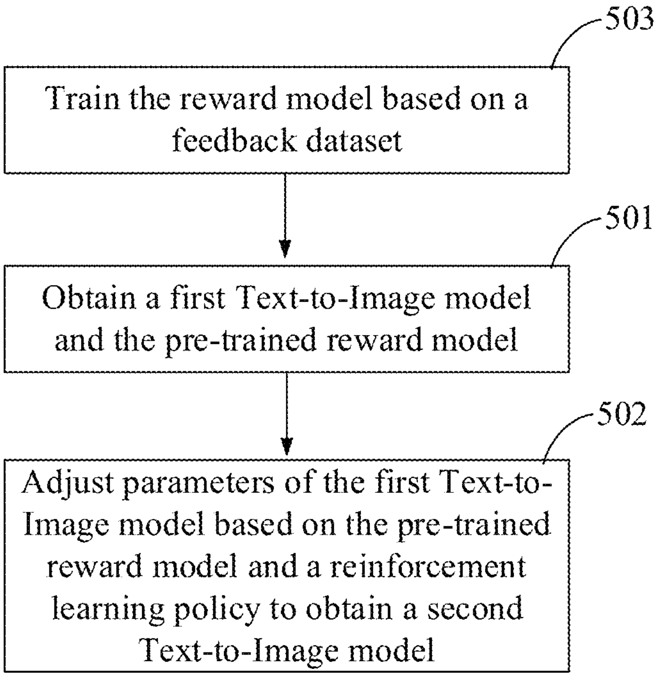
FIG. 5 illustrates a flowchart of a method for training a Text-to-Image model according to embodiments of the present disclosure.

FIG. 5 illustrates a flowchart of a method for training a Text-to-Image model according to embodiments of the present disclosure. As shown in FIG. 5, the method for training a Text-to-Image model comprises:

Step S501, obtaining a first Text-to-Image model and a pre-trained reward model, wherein the first Text-to-Image model is used to generate a corresponding image based on input text, and the pre-trained reward model is used to score a data pair composed of the input text and the corresponding generated image.

Step S502, adjusting the parameters of the first Text-to-Image model based on the pre-trained reward model and a reinforcement learning policy to obtain a second Text-to-Image model, wherein the accumulated reward obtained by the second Text-to-Image model in a generation sequence for implementing the Text-to-Image satisfies a preset condition, and the accumulated reward is obtained based on the reward of each stage of the generation sequence.

Prior to step S501, there is further included step S503 configured to train the reward model based on a feedback dataset.

As a feasible implementation, the pre-trained reward model is obtained by training based on feedback dataset, wherein the feedback dataset comprises a plurality of feedback data, and the plurality of feedback data comprise a data pair composed of the input text and the corresponding generated image, and a feedback state corresponding to the data pair, and wherein the feedback state is used to represent that the corresponding generated image which is generated relative to the same input text belongs to a positive feedback or a negative feedback. That is, the feedback data in the feedback dataset is actually a "input-output-evaluation" triple, wherein the feedback state is usually given based on human feedback.

It is assumed that there are four ranked generated images A, B, C, and D based on one input text x, which have an ordering, A>B>C>D, based on human feedback. Wherein, for the input text x, image A is considered to be superior to image B in human general cognition. When the reward model is trained using a known order, the higher ranking the data, the closer it is to a positive feedback (high-quality image), and the lower ranking the data, the closer it is to a negative feedback (inferior image).

According to some embodiments, training the reward model comprises: training the reward model in a comparative learning manner based on a plurality of feedback data, such that the reward model outputs a first reward score for the data pair having a feedback state of positive feedback, and outputs a second reward score for the data pair having a feedback state of negative feedback, wherein the difference between the first reward score and the second reward score is used to represent the quality difference of the corresponding generated images.

There are four ranked generation images A, B, C, and D based on one input text x, which have an order based on human feedback: A>B>C>D. The scores of the four generated images by the reward model needs to satisfy: r(A)>r(B)>r(C)>r(D), therefore, the loss function of the reward model is:

$$\text{loss}(\theta) = E_{x,y_w,y_l \sim D_{RM}}[\log(\sigma(r_\theta(x, y_w) - r_\theta(x, y_l)))]$$

where θ is the reward model parameter; x is the input text; $y_w$, $y_l$ are respectively an image with higher quality and an image with lower quality; $D_{RM}$ is the dataset used by the reward model; r is the reward model, the output of the reward model is a scalar, which means the reward score of the input text and the output image by the model. To better normalize the difference, the difference may be pulled to be between 0 and 1 by a sigmoid function σ for every two differences.

Since the data in the feedback dataset has been ranked by default from high to low scores, it is only necessary to iteratively calculate the difference of the scores of the previous and subsequent items and add them up.

As a feasible implementation, step 503 may be performed multiple times to achieve a better optimization effect of the reward model.

According to some embodiments, the feedback dataset includes a plurality of feedback data from at least two different sources. The feedback dataset may include feedback data from a plurality of different sources. More data sources are introduced, and data is collected from multiple perspectives, such as user feedback and manual labeling. For the feedback data from different sources, the optimized Text-to-Image model can add consideration of alignment factors such as a multi-entity combination and a painting style on the basis of quantity, attribute and background of interest.

According to some embodiments, the plurality of feedback data include at least two of the data fed back by a user, manually labeled data, and manually compared data, wherein the data fed back by the user includes the feedback state based on the user behavior; the manually labeled data includes the feedback state based on the result of manual labeling; and the manually compared data includes the feedback state based on different versions of the generated images.

$D_{RM}$ is the dataset used by the reward model that includes three parts: the user feedback, the manual label, and the manual comparison. Wherein, the user feedback is generally related to the form of a product, for example, the data which the user may have interest in and like, or the behaviors of the user, such as splitting, or zooming, or commenting, and by determining these behaviors of the user, the drawing style may be taken into consideration; manual label generally involves professional annotators who help to label high quality images and inferior images, to distinguish good ones from bad ones; and manual comparison is that different versions of the Text-to-Image model compare the data pair composed of the same input text and the generated image, so that improvements on the entity combination can be generated.

Figure 6:
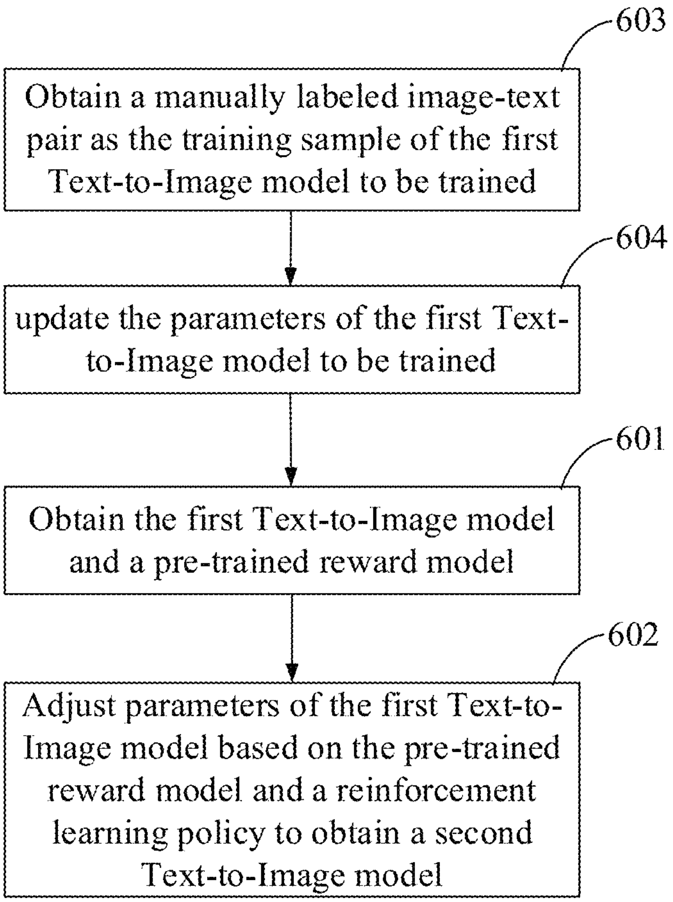
FIG. 6 illustrates a flowchart of a method for training a Text-to-Image model according to embodiments of the present disclosure.

According to some embodiments, FIG. 6 illustrates a flowchart of a method for training a Text-to-Image model according to embodiments of the present disclosure. As shown in FIG. 6, the method for training a Text-to-Image model comprises:

Step S601, obtaining a first Text-to-Image model and a pre-trained reward model, wherein the first Text-to-Image model is used to generate a corresponding image based on input text, and the pre-trained reward model is used to score a data pair composed of the input text and the corresponding generated image.

Step S602, adjusting the parameters of the first Text-to-Image model based on the pre-trained reward model and a reinforcement learning policy to obtain a second Text-to-Image model, wherein the accumulated reward obtained by the second Text-to-Image model in a generation sequence for implementing the Text-to-Image satisfies a preset condition, and the accumulated reward is obtained based on the reward of each stage of the generation sequence.

Prior to step S601, there is further included step S603, obtaining a manually labeled image-text pair as the training sample of the first Text-to-Image model to be trained; and step S604, updating the parameters of the first Text-to-Image model to be trained based on a back propagation algorithm to obtain the first Text-to-Image model that has gone through supervised training.

The first Text-to-Image model can be obtained by means of pre-trained Text-to-Image model fine-tuning (Supervised Fine-Tuning, SFT), and when fine-tuning using the pre-trained Text-to-Image model using SFT, a standard supervised learning manner can be used, that is, manually labeled (input and output) text pairs are used as training samples, and a back propagation algorithm is used to update the parameters of the model. By this way, the model can better understand each input and the corresponding output, and perform the corresponding operation on the input. In addition, the pre-trained Text-to-Image model fine-tuning SFT may also effectively reduce errors that occur when the model is executed in sequence, thereby improving the quality of the generated result.

According to some embodiments, the present disclosure further provides a Text-to-Image model, and the Text-to-Image model is obtained by training via the method for training the Text-to-Image model provided in the foregoing embodiment.

Figure 7:
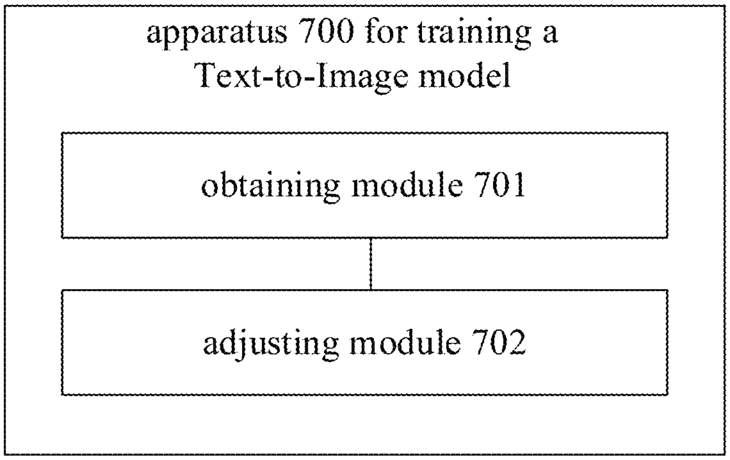
FIG. 7 illustrates a structural block diagram of the apparatus 700 for training a Text-to-Image model according to embodiments of the present disclosure.

FIG. 7 is a structural block diagram of an apparatus 700 for training a Text-to-Image model according to embodiments of the present disclosure. As shown in FIG. 7, the apparatus 700 for training a Text-to-Image model comprises:

An obtaining module 701, the obtaining module 701 is configured to obtain a first Text-to-Image model and a pre-trained reward model, wherein the first Text-to-Image model generates a corresponding image based on input text, and the pre-trained reward model scores a data pair composed of the input text and the corresponding generated image.

Since a plurality of output results (i.e., generated images) can be generated for the same input text, it is necessary to use a reward model (RM) to score the generated images to generate a reward signal, which ranks or evaluates the generated images from a human perspective.

By collecting data which is manually fed back data by the reward model and training the reward model in a comparative learning manner, the discrimination sequence of the reward model is consistent with the general cognition of a human being.

An adjusting module 702, the adjusting module 702 is configured to adjust the parameters of the first Text-to-Image model based on the pre-trained reward model and a reinforcement learning policy to obtain a second Text-to-Image model, wherein the accumulated reward obtained by the second Text-to-Image model in a generation sequence for implementing the Text-to-Image satisfies a preset condition, and the accumulated reward is obtained based on the sum of each reward of the generation sequence.

The step of denoising the Text-to-Image model to generate an image is used as a reinforcement learning trajectory, and the reward signal is used to control the whole generation process, so that the model is optimized in the direction of a high accumulated reward.

By using a first Text-to-Image model as the basis for training, errors that occur when the model is executed in sequence can be effectively reduce, thus the quality of the generated result can be improved. In this way, the initial model (the first Text-to-Image model) can better understand each input and the corresponding output, and perform corresponding operations on the input. As a feasible implementation, a fine-tuning training may also be performed on the first Text-to-Image model by using relatively high-quality data pair, thereby improving the overall performance of the model. Wherein, the relatively high-quality data pair may be an additional image-text pair, for example, a manually labeled image-text pair.

According to some embodiments, the preset conditions include one condition that the accumulated reward obtained by the second Text-to-Image model in the generation sequence for implementing the Text-to-Image is higher than the accumulated reward obtained by the first Text-to-Image model in the generation sequence for implementing the Text-to-Image.

Since the Text-to-Image model generally generates a final result after many times of environment (State)-behavior (Action), that is, there may be a plurality of input text and generated images, although each behavior (Action) has a reward (Reward), that is, each output noise is scored, and the sum of all the rewards is finally actually reflected to the result, that is, the accumulated reward. The environment (State) in the reinforcement learning policy may have countless situations, and there may also be many feasible solutions under one environment (State). Therefore, if the parameters are updated after every cycle of State-Action-Reward, this model would become very “short-sighted” or even difficult to converge, therefore, it is likely that the model can only cope with the “current situation” and cannot cope with numerous environments (State). Therefore, the ultimate object of the reinforcement learning policy is the optimal of the sequence (Trajectory), rather than the optimal of any of the actions (Action).

According to some embodiments, the reinforcement learning policy includes a proximal policy optimization (PPO) algorithm.

The proximal policy optimization algorithm is an improved algorithm of policy gradients. In a traditional policy gradient algorithm, the policy weight is updated based on a target function gradient and a step length, therefore, the updating process may have two common problems, that is, Overshooting and Undershooting, wherein Overshooting means that the updating misses the reward peak value and falls into a suboptimal policy region, and Undershooting means that taking an excessively small updating step length in the gradient direction causes slow convergence.

Among the problems of supervised learning, Overshooting is not a big problem because the data is fixed and can be re-corrected in the next stage (epoch), but among the problems of reinforcement learning, if falling into a suboptimal policy region due to Overshooting, future sample batches may not provide much meaningful information, and updating the policy using the suboptimal data samples leads to unrecoverable bad positive feedback.

The proximal policy optimization PPO algorithm solves this problem by setting a target divergence, and it is expected that each update is located in a certain interval around the target divergence. Wherein, the target divergence should be large enough to significantly change the policy, but also should be small enough to keep the update stable. After each update, the proximal policy optimization PPO algorithm checks the size of the update. If the final updated divergence exceeds 1.5 times the target divergence, the loss factor$\beta$ is doubled in the next iteration to increase the punishment. On the contrary, if the update is too small, the loss factor$\beta$ is halved to effectively expand the trust region.

Figure 8:
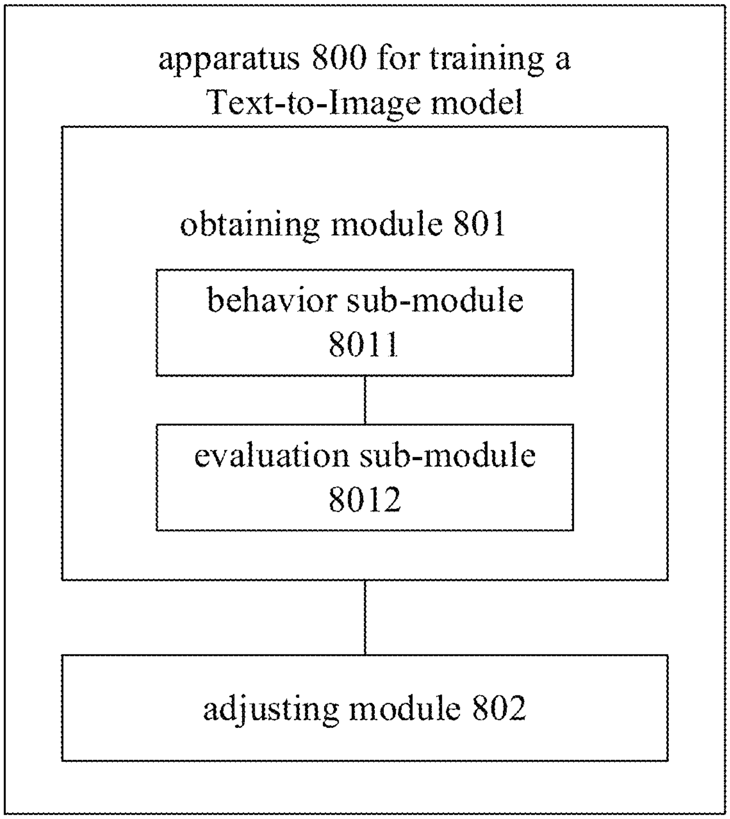
FIG. 8 illustrates a structural block diagram of the apparatus 800 for training a Text-to-Image model according to embodiments of the present disclosure.

According to some embodiments, the proximal policy optimization PPO algorithm uses a behavior sub-model and an evaluation sub-model. FIG. 8 illustrates a structural block diagram of the apparatus 800 for training a Text-to-Image model according to embodiments of the present disclosure. As shown in FIG. 8, the adjusting module 801 comprises:

- a behavior sub-module 8011, which is configured to initialize the behavior sub-model based on the first Text-to-Image model; and
- an evaluation sub-module 8012, which is configured to initialize the evaluation sub-model based on the pre-trained reward model.

The selection of the initial point can determine whether the algorithm converges to a certain extent, and when it converges, the initial point can determine how fast the learning converges and whether it can converge to a high-cost point or a low-cost point. An initialization which is too large may result in gradient explosion, and an initialization which is too small may result in gradient disappearance. Therefore, the policy may be trained using offline data (i.e., the data collected by a human presenter, a script policy, or other reinforcement learning intelligent agent) and be used to initialize a new reinforcement learning policy. This process makes the new reinforcement learning policy looks like it is pre-trained. Then, the policy is used to initialize the subject (i.e., the behavior sub-model, Actor)—evaluation (i.e., the evaluation sub-model, Critic) network for fine tuning, where the pre-trained first Text-to-Image model is used as the initial subject (Actor), and the pre-trained reward model is used as the initial evaluation (Critic). Random exploration of the state space is avoided by using a prior information. The prior information helps the intelligent agent to understand which states of the environment are good and should be further explored. Meanwhile, the first Text-to-Image model and the reward model are simultaneously fine-tuned to enable the fine-tuned Text-to-Image model to consider the factor of the reward model in order to avoid detail problems.

The adjusting module 802 is the same as the adjusting module in the foregoing embodiments and is not described herein.

According to some embodiments, the generation sequence comprises at least one stage, wherein, for each stage of the generation sequence:

- the behavioral sub-module 8011 is further configured to generate a corresponding output noise image based on the input text being provided; and
- the evaluation sub-module 8012 is further configured to output the reward of the current stage based on the input text and the output noise image of the current stage.

For example, two images Y1 and Y2 are generated based on the same input text X, where one is from the first Text-to-Image model, and the other one is from the Text-to-Image model of the current iteration through the reinforcement learning policy. The generated images of the two models above are compared to calculate a differential reward, which can also be considered as a penalty item since it can be positive or negative. This item is used to reward or punish the degree to which the generation of the reinforcement learning policy in each training batch deviates from the initial model (i.e., the first Text-to-Image model) to ensure that the model outputs a reasonable generated image. Removing this penalty item may cause the model to generate a gibberish patchwork image in the optimization to fool the reward model in order to provide a high reward value.

The reward is a function that generates a scalar that represents the "goodness" of the agent that is in a particular state and takes a particular action.

Figure 9:
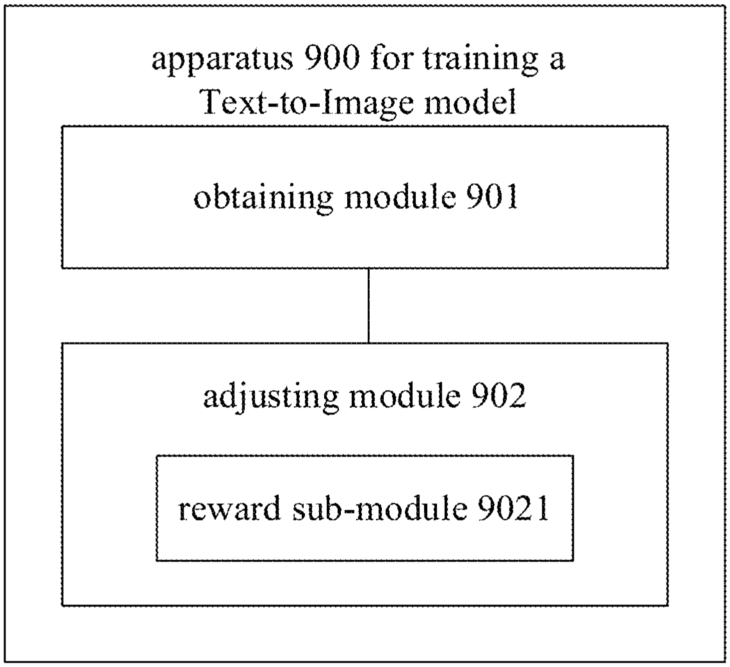
FIG. 9 illustrates a structural block diagram of the apparatus 900 for training a Text-to-Image model according to embodiments of the present disclosure.

According to some embodiments, FIG. 9 illustrates a structural block diagram of the apparatus 900 for training a Text-to-Image model according to embodiments of the present disclosure. As shown in FIG. 9, the adjusting module 902 further comprises: the reward sub-module 9021, which is configured to generate an accumulated reward obtained in a generation sequence comprises a total score and a loss item, wherein the total score is obtained by a pre-trained reward model based on the initial input and the final output of the generation sequence, and the loss item is the product of the reward and the loss coefficient of the last stage of the generation sequence.

The reward function may be designed as:

$$\text{objective}(\theta) = \text{score} - \beta(\log\pi_{\theta'}(a_t|s_t) - \log\pi_{SFT}(a_t|s_t))$$

where $\theta$ is the generation model parameter; score is the score of the input text (initial input) and the generated image (final output) by the reward model; $a_t$,$s_t$ are the behavior (Action) and the environment (State) at moment t, respectively, that is, the output noise, the input text, and the output noisy image of the corresponding Text-to-Image model; $\pi_{SFT}$ is the pre-trained first Text-to-Image model parameter, and $\pi_{\theta'}$ is the Text-to-Image model parameter of the current iteration in the reinforcement learning policy; and $\beta$ is the loss coefficient.

This formula is preceded by a positive value, and the purpose of score is to make the total score accumulated larger and better in meeting the expectation; and the second item is a penalty item that enables the trained model not to deviate from the previously adjusted model, and otherwise, some results that do not meet the expectation may be made.

The obtaining module 901 is the same as the obtaining module in the foregoing embodiment, and details are not described herein.

Figure 10:
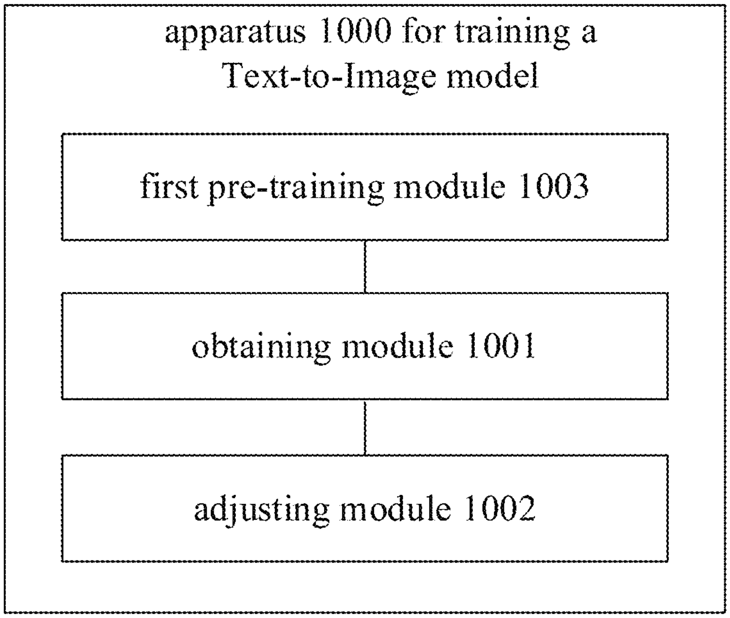
FIG. 10 illustrates a structural block diagram of the apparatus 1000 for training a Text-to-Image model according to embodiments of the present disclosure.

FIG. 10 illustrates a structural block diagram of the apparatus 1000 for training a Text-to-Image model according to some embodiments of the present disclosure. As shown in FIG. 10, the apparatus 1000 for training the Text-to-Image model further comprises:

the first pre-training module 1003, which is configured to train a reward model based on feedback dataset to obtain a pre-trained reward model, wherein the feedback dataset comprises a plurality of feedback data, and the plurality of feedback data comprise a data pair composed of the input text and the corresponding generated image and a feedback state corresponding to the data pair, wherein the feedback state is used to represent that the corresponding generated image which is generated relative to the same input text belongs to a forward feedback or a negative feedback.

The pre-trained reward model is obtained by training based on feedback dataset, wherein the feedback dataset comprises a plurality of feedback data, and the plurality of feedback data comprise a data pair composed of the input text and the corresponding generated image, and a feedback state corresponding to the data pair, where the feedback state is used to represent that the corresponding generated image which is generated relative to the same input text belongs to a positive feedback or a negative feedback. That is, the feedback data in the feedback dataset is actually a "input-output-evaluation" triple, wherein the feedback state is usually given based on human feedback.

It is assumed that there are four ranked generated images A, B, C, and D based on one input text x, which have an ordering, A>B>C>D, based on human feedback. Wherein, for the input text x, image A is considered to be superior to image B in human general cognition. When the reward model is trained using a known ordering, the higher ranking the data, the closer it is to a positive feedback (high-quality image), and the lower ranking the data, the closer it is to a negative feedback (inferior image).

There are four ranked generation images A, B, C, and D based on one input text x, which have an ordering based on human feedback: A>B>C>D. The scores of the four generated images by the reward model needs to satisfy: r(A)>r(B)>r(C)>r(D), therefore, the loss function of the reward model is:

$$\text{loss}(\theta) = E_{x,y_w,y_l \sim D_{RM}}[\log(\sigma(r_\theta(x, y_w) - r_\theta(x, y_l)))]$$

where θ is the reward model parameter; x is the input text; $y_w$, $y_l$ are respectively an image with higher quality and an image with lower quality; $D_{RM}$ is the dataset used by the reward model; r is the reward model, the output of the reward model is a scalar, which means the reward score of the input text and the output image by the model. To better normalize the difference, the difference may be pulled to be between 0 and 1 by a sigmoid function σ for every two differences.

Since the data in the feedback dataset has been ranked by default from high to low scores, it is only necessary to iteratively calculate the difference of the scores of the previous and subsequent items and add them up.

The obtaining module 1001 and the adjusting module 1002 are the same as the obtaining module and the adjusting module in the foregoing embodiment, and are not described herein again.

Figure 11:
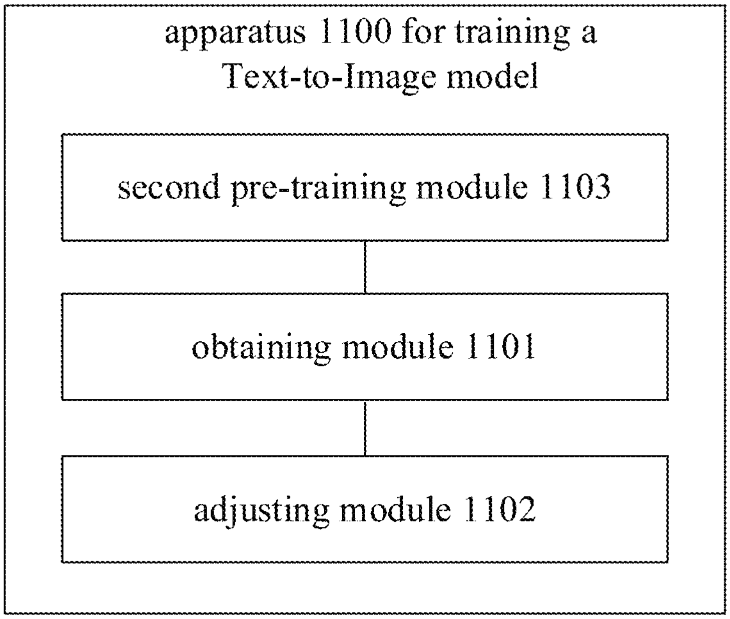
FIG. 11 illustrates a structural block diagram of the apparatus 1100 for training a Text-to-Image model according to embodiments of the present disclosure.

FIG. 11 illustrates a structural block diagram of the apparatus 1100 for training a Text-to-Image model according to some embodiments of the present disclosure. As shown in FIG. 11, the apparatus 1100 for training the Text-to-Image model further comprises:

the second pre-training module 1104, and the second pre-training module 1104 is configured to train the first Text-to-Image model to be trained based on a manually labeled image-text pair to obtain the first Text-to-Image model that has gone through supervised training.

The first Text-to-Image model can be obtained by means of pre-trained Text-to-Image model fine-tuning (Supervised Fine-Tuning, SFT), and when fine tuning using the pre-trained Text-to-Image model fine-tuning SFT, a standard supervised learning method can be used, that is, manually labeled (input and output) text pairs are used as training samples, and a back propagation algorithm is used to update the parameters of the model. By this way, the model can better understand each input and the corresponding output, and perform the corresponding operation on the input. In addition, the pre-trained Text-to-Image model fine-tuning SFT may also effectively reduce errors that occur when the model is executed in sequence, thereby improving the quality of the generated result.

The obtaining module 1101 and the adjusting module 1102 are the same as the obtaining module and the adjusting module in the foregoing embodiments, and details are not described herein.

According to the embodiments of the present disclosure, there is provided an electronic device, a computer-readable storage medium, and a computer program product.

Figure 12:
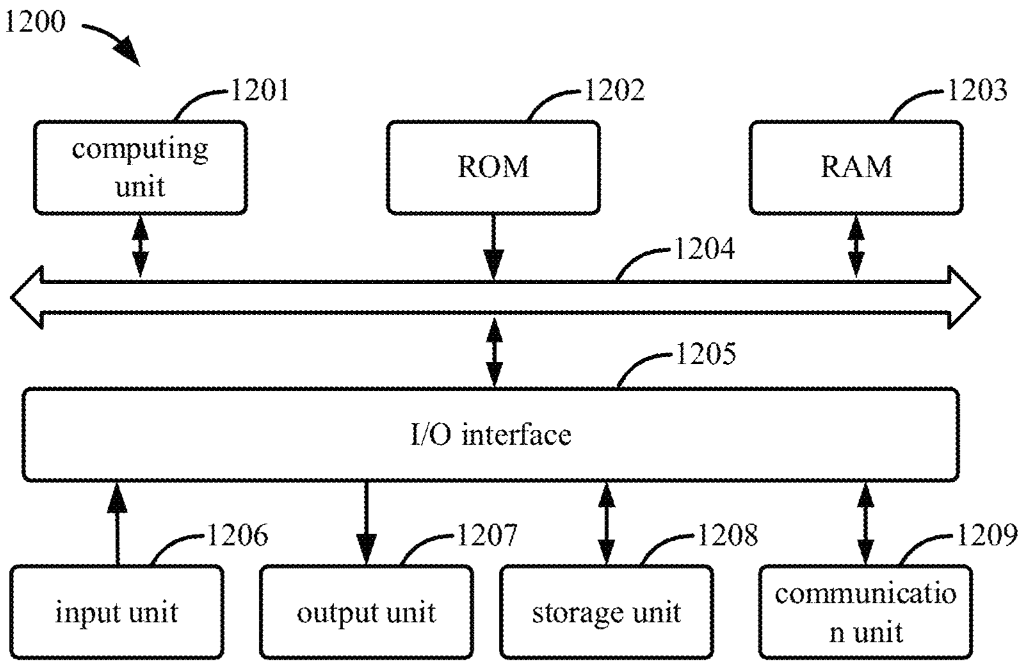
FIG. 12 illustrates a structural block diagram of an example electronic device that can be used to implement embodiments of the present disclosure.

Referring to FIG. 12, a structural block diagram of an electronic device 1200 that may be a server or client of the present disclosure is now described, which is an example of a hardware device that may be applied to aspects of the present disclosure. Electronic devices are intended to represent various forms of digital electronic computer devices, such as laptop computers, desktop computers, workstations, personal digital assistants, servers, blade servers, mainframe computers, and other suitable computers. The electronic devices may also represent various forms of mobile devices, such as personal digital processing, cellular telephones, smart phones, wearable devices, and other similar computing devices. The components shown herein, their connections and relationships, and their functions are merely as examples, and are not intended to limit the implementations of the disclosure described and/or claimed herein.

As shown in FIG. 12, the electronic device 1200 includes a computing unit 1201, which may perform various appropriate actions and processing according to a computer program stored in a read-only memory (ROM) 1202 or a computer program loaded into a random access memory (RAM) 1203 from a storage unit 1208. In the RAM 1203, various programs and data required by the operation of the electronic device 1200 may also be stored. The computing unit 1201, the ROM 1202, and the RAM 1203 are connected to each other through a bus 1204. Input/output (I/O) interface 1205 is also connected to the bus 1204.

A plurality of components in the electronic device 1200 are connected to a I/O interface 1205, including: an input unit 1206, an output unit 1207, a storage unit 1208, and a communication unit 1209. The input unit 1206 may be any type of device capable of inputting information to the electronic device 1200, the input unit 1206 may receive input digital or character information and generate a key signal input related to user setting and/or function control of the electronic device, and may include, but is not limited to, a mouse, a keyboard, a touch screen, a track pad, a trackball, a joystick, a microphone, and/or a remote control. The output unit 1207 may be any type of device capable of presenting information, and may include, but are not limited to, a display, a speaker, a video/audio output terminal, a vibrator, and/or a printer. The storage unit 1208 may include, but is not limited to, a magnetic disk and an optical disk. The communication unit 1209 allows the electronic device 1200 to exchange information/data with other devices over a computer network, such as the Internet, and/or various telecommunication networks, and may include, but is not limited to, a modem, a network card, an infrared communication device, a wireless communication transceiver and/or a chipset, such as a Bluetooth device, a 802.11 device, a WiFi device, a WiMAX device, a cellular communication device, and/or the like.

The computing unit 1201 may be a variety of general and/or special purpose processing components with processing and computing capabilities. Some examples of the computing unit 1201 include, but are not limited to, a central processing unit (CPU), a graphics processing unit (GPU), various dedicated artificial intelligence (AI) computing chips, various computing units running machine learning model algorithms, a digital signal processor (DSP), and any suitable processor, controller, microcontroller, etc. The computing unit 1201 performs the various methods and processes described above, such as the method for training a Text-to-Image model provided in the foregoing embodiments. For example, in some embodiments, the method for training a Text-to-Image model provided in the foregoing embodiments may be implemented as a computer software program tangibly contained in a machine-readable medium, such as the storage unit 1208. In some embodiments, part or all of the computer program may be loaded and/or installed onto the electronic device 1200 via the ROM 1202 and/or the communication unit 1209. When the computer program is loaded to the RAM 1203 and executed by the computing unit 1201, one or more steps of the method for training a Text-to-Image model provided in the foregoing embodiments described above may be performed. Alternatively, in other embodiments, the computing unit 1201 may be configured to perform the method for training a Text-to-Image model provided in the foregoing embodiments by any other suitable means (e.g., with the aid of firmware).

Various embodiments of the systems and techniques described above herein may be implemented in a digital electronic circuit system, an integrated circuit system, a field programmable gate array (FPGA), an application specific integrated circuit (ASIC), a dedicated standard product (ASSP), a system of system on a chip system (SoC), a complex programmable logic device (CPLD), computer hardware, firmware, software, and/or combinations thereof. These various embodiments may include: implementation in one or more computer programs that may be executed and/or interpreted on a programmable system including at least one programmable processor, where the programmable processor may be a dedicated or universal programmable processor that may receive data and instructions from a storage system, at least one input device, and at least one output device, and transmit data and instructions to the storage system, the at least one input device, and the at least one output device.

The program code for implementing the method of the present disclosure may be written in any combination of one or more programming languages. These program code may be provided to a processor or controller of a general-purpose computer, a special purpose computer, or other programmable data processing device such that the program code, when executed by the processor or controller, causes the functions/operations specified in the flowchart and/or block diagram to be implemented. The program code may be executed entirely on the machine, partly on the machine, partly on the machine as a stand-alone software package and partly on the remote machine or entirely on the remote machine or server.

In the context of the present disclosure, a machine-readable medium may be a tangible medium, which may contain or store a program for use by or in connection with an instruction execution system, device, or device. The machine-readable medium may be a machine-readable signal medium or a machine-readable storage medium. The machine-readable medium may include, but is not limited to, electronic, magnetic, optical, electromagnetic, infrared, or semiconductor systems, apparatus, or devices, or any suitable combination of the foregoing. More specific examples of a machine-readable storage media may include an electrical connection based on one or more wires, a portable computer disk, a hard disk, a random access memory (RAM), a read-only memory (ROM), an erasable programmable read-only memory (EPROM or flash memory), an optical fiber, a portable compact disk read-only memory (CD-ROM), an optical storage device, a magnetic storage device, or any suitable combination of the foregoing.

To provide interaction with a user, the systems and techniques described herein may be implemented on a computer having: a display device (e.g., a CRT (cathode ray tube) or an LCD (liquid crystal display) monitor) for displaying information to a user; and a keyboard and pointing device (e.g., a mouse or trackball) by which a user may provide input to the computer. Other types of devices may also be used to provide interaction with a user; for example, the feedback provided to the user may be any form of perception feedback (e.g., visual feedback, auditory feedback, or tactile feedback); and the input from the user may be received in any form, including acoustic input, voice input, or haptic input.

The systems and techniques described herein may be implemented in a computing system including a back-end component (e.g., as a data server), or a computing system including a middleware component (e.g., an application server), or a computing system including a front-end component (e.g., a user computer with a graphical user interface or a web browser, the user may interact with implementations of the systems and techniques described herein through the graphical user interface or the web browser), or in a computing system including any combination of such back-end components, middleware components, or front-end components. The components of the system may be interconnected by digital data communication (e.g., a communications network) in any form or medium. Examples of communication networks include a local area network (LAN), a wide area network (WAN), the Internet, and a blockchain network.

The computer system may include a client and a server. Clients and servers are generally remote from each other and typically interact through a communication network. The relationship between clients and servers is generated by computer programs running on respective computers and having a client-server relationship to each other. The server may be a cloud server, or may be a server of a distributed system, or a server incorporating a blockchain.

It should be understood that the various forms of processes shown above may be used, and the steps may be reordered, added, or deleted. For example, the steps described in the present disclosure may be performed in parallel or sequentially or in a different order, as long as the results expected by the technical solutions disclosed in the present disclosure can be achieved, and no limitation is made herein.

Although embodiments or examples of the present disclosure have been described with reference to the accompanying drawings, it should be understood that the foregoing methods, systems, and devices are merely examples, and the scope of the present disclosure is not limited by these embodiments or examples, but is only defined by the authorized claims and their equivalents. Various elements in the embodiments or examples may be omitted or may be replaced by equivalent elements thereof. Further, the steps may be performed by a different order than described in this disclosure. Further, various elements in the embodiments or examples may be combined in various ways. Importantly, with the evolution of the technology, many elements described herein may be replaced by equivalent elements appearing after the present disclosure.

What is claimed is:

1. A method, comprising:

obtaining a first Text-to-Image model and a pre-trained reward model, wherein the first Text-to-Image model is used to generate a corresponding image based on an input text, and the pre-trained reward model is used to score a data pair composed of the input text and the corresponding image; and adjusting parameters of the first Text-to-Image model based on the pre-trained reward model and a reinforcement learning policy to obtain a second Text-to-Image model, wherein an accumulated reward obtained by the second Text-to-Image model in a generation sequence for implementing Text-to-Image satisfies a preset condition, and the accumulated reward is obtained based on a reward of each stage of the generation sequence;

wherein the reinforcement learning policy comprises a proximal policy optimization algorithm, wherein the proximal policy optimization algorithm uses a behavior sub-model and an evaluation sub-model, wherein the behavior sub-model is obtained based on initialization of the first Text-to-Image model, and the evaluation sub-model is obtained based on initialization of the pre-trained reward model;

wherein the generation sequence comprises at least one stage, and wherein the method further comprises:

for each stage of the generation sequence:

generating, by the behavior sub-model, a corresponding output noisy image based on the input text provided; and outputting, by the evaluation sub-model, the reward of a current stage based on the input text and the output noisy image of the current stage;

wherein the reward of the current stage comprises a relative entropy between an output of the behavior sub-model in a previous stage prior to the current stage and an output of the behavior sub-model in the current stage; and wherein the accumulated reward obtained in the generation sequence comprises a total score and a loss item, wherein the total score is obtained by the pre-trained reward model based on an initial input and a final output of the generation sequence, and the loss item is a product of the reward of the last stage of the generation sequence and a loss coefficient.

2. The method of claim 1, wherein the preset condition comprises that the accumulated reward obtained by the second Text-to-Image model in the generation sequence for implementing Text-to-Image is higher than an accumulated reward obtained by the first Text-to-Image model in a generation sequence for implementing Text-to-Image.

3. The method of claim 1, wherein the reward of the current stage comprises a difference between an evaluation value of a previous stage prior to the current stage and an evaluation value of the current stage, wherein the evaluation value is scored by the pre-trained reward model based on the input text provided and the corresponding output noisy image.

4. The method of claim 1, wherein the parameters of the second Text-to-Image model are obtained by a back-propagation algorithm based on the accumulated reward in the generation sequence of the second Text-to-Image model.

5. The method of claim 1, wherein the pre-trained reward model is obtained by training based on a feedback dataset, wherein the feedback dataset comprises a plurality of feedback data, and the plurality of feedback data comprise a data pair composed of the input text and the corresponding generated image and a feedback state corresponding to the data pair, wherein the feedback state is used to represent that the corresponding generated image which is generated relative to a same input text belongs to a positive feedback or a negative feedback.

6. The method of claim 5, further comprising training the reward model, wherein training the reward model comprises:

training the reward model in a comparative learning manner based on the plurality of feedback data, such that the reward model outputs a first reward score for the data pair having a feedback state of positive feedback, and outputs a second reward score for the data pair having a feedback state of negative feedback, wherein a difference between the first reward score and the second reward score is used to represent the quality difference of the corresponding generated images.

7. The method of claim 5, wherein the feedback dataset comprises the plurality of feedback data from at least two different sources.

8. The method of claim 7, wherein the plurality of feedback data comprises at least two of data fed back by a user, manually labeled data, or manually compared data, wherein:

the data fed back by the user includes the feedback state based on user behavior;

the manually labeled data includes the feedback state based on a result of manual labeling;

the manually compared data includes the feedback state based on different versions of the generated images.

9. The method of claim 1, wherein obtaining the first Text-to-Image model comprises:

obtaining a manually labeled image-text pair as a training sample of the first Text-to-Image model to be trained; and updating parameters of the first Text-to-Image model to be trained based on a back propagation algorithm to obtain the first Text-to-Image model that has gone through supervised training.

10. An electronic device, comprising:

a processor; and a memory communicatively connected to the processor, wherein the memory stores instructions executable by the processor, and the instructions, when executed by the processor, cause the processor to perform operations comprising:

obtaining a first Text-to-Image model and a pre-trained reward model, wherein the first Text-to-Image model is used to generate a corresponding image based on an input text, and the pre-trained reward model is used to score a data pair composed of the input text and the corresponding image; and adjusting parameters of the first Text-to-Image model based on the pre-trained reward model and a reinforcement learning policy to obtain a second Text-to-Image model, wherein an accumulated reward obtained by the second Text-to-Image model in a generation sequence for implementing Text-to-Image satisfies a preset condition, and the accumulated reward is obtained based on a reward of each stage of the generation sequence;

wherein the reinforcement learning policy comprises a proximal policy optimization algorithm, wherein the proximal policy optimization algorithm uses a behavior sub-model and an evaluation sub-model, wherein the behavior sub-model is obtained based on initialization of the first Text-to-Image model, and the evaluation sub-model is obtained based on initialization of the pre-trained reward model;

wherein the generation sequence comprises at least one stage, and wherein the operations further comprise:

for each stage of the generation sequence:

generating, by the behavior sub-model, a corresponding output noisy image based on the input text provided; and outputting, by the evaluation sub-model, the reward of a current stage based on the input text and the output noisy image of the current stage;

wherein the reward of the current stage comprises a relative entropy between an output of the behavior sub-model in a previous stage prior to the current stage and an output of the behavior sub-model in the current stage; and wherein the accumulated reward obtained in the generation sequence comprises a total score and a loss item, wherein the total score is obtained by the pre-trained reward model based on an initial input and a final output of the generation sequence, and the loss item is a product of the reward of the last stage of the generation sequence and a loss coefficient.

11. The electronic device of claim 10, wherein the preset condition comprises that the accumulated reward obtained by the second Text-to-Image model in the generation sequence for implementing Text-to-Image is higher than an accumulated reward obtained by the first Text-to-Image model in a generation sequence for implementing Text-to-Image.

12. A non-transitory computer readable storage medium storing computer instructions, wherein the computer instructions, when executed by a processor, are configured to enable a computer to perform operations comprising:

obtaining a first Text-to-Image model and a pre-trained reward model, wherein the first Text-to-Image model is used to generate a corresponding image based on an input text, and the pre-trained reward model is used to score a data pair composed of the input text and the corresponding image; and adjusting parameters of the first Text-to-Image model based on the pre-trained reward model and a reinforcement learning policy to obtain a second Text-to-Image model, wherein an accumulated reward obtained by the second Text-to-Image model in a generation sequence for implementing Text-to-Image satisfies a preset condition, and the accumulated reward is obtained based on a reward of each stage of the generation sequence;

wherein the reinforcement learning policy comprises a proximal policy optimization algorithm, wherein the proximal policy optimization algorithm uses a behavior sub-model and an evaluation sub-model, wherein the behavior sub-model is obtained based on initialization of the first Text-to-Image model, and the evaluation sub-model is obtained based on initialization of the pre-trained reward model;

wherein the generation sequence comprises at least one stage, and wherein the operations further comprise:

for each stage of the generation sequence:

generating, by the behavior sub-model, a corresponding output noisy image based on the input text provided; and outputting, by the evaluation sub-model, the reward of a current stage based on the input text and the output noisy image of the current stage;

wherein the reward of the current stage comprises a relative entropy between an output of the behavior sub-model in a previous stage prior to the current stage and an output of the behavior sub-model in the current stage; and wherein the accumulated reward obtained in the generation sequence comprises a total score and a loss item, wherein the total score is obtained by the pre-trained reward model based on an initial input and a final output of the generation sequence, and the loss item is a product of the reward of the last stage of the generation sequence and a loss coefficient.

* * * * *